May 24, 1960 N. J. PETERSON ET AL 2,937,717

SPRING POWERED ENGINE STARTER

Filed March 7, 1958 3 Sheets-Sheet 1

INVENTORS
N.J. PETERSON
WILLIAM J. BORER

BY Ralph L. Burch
ATTORNEY

INVENTORS
NEAL J. PETERSON
WILLIAM J. BORER

BY Ralph Burch

ATTORNEY

May 24, 1960 N. J. PETERSON ET AL 2,937,717

SPRING POWERED ENGINE STARTER

Filed March 7, 1958 3 Sheets-Sheet 3

INVENTOR
NEAL J. PETERSON
WILLIAM. J. BORER

BY Ralph Burch

ATTORNEY

United States Patent Office 2,937,717
Patented May 24, 1960

2,937,717

SPRING POWERED ENGINE STARTER

Neal J. Peterson, 1516 N St., and William J. Borer, 510 N. 14th St., both of Tekamah, Nebr.

Filed Mar. 7, 1958, Ser. No. 719,803

5 Claims. (Cl. 185—39)

This invention relates to a spring powered motor for use as a starter for fractional horsepower engines such as used in power lawn mowers and the like.

It is an object of the invention to provide a multiple spring motor associated with the engine shaft capable of storing sufficient energy to rotate the engine shaft to start the engine.

A further object of the invention resides in compactly arranging a series of springs in association with an engine shaft and connecting the springs with the engine shaft so that when the springs are wound and then released they will produce sufficient energy to rotate the engine shaft to start the engine.

A still further object of the invention resides in providing a series of springs connected with the drive shaft of an engine with means for winding the springs and a clutch for holding the springs wound until it is desired to release the spring energy to rotate the drive shaft.

Another object of the invention resides in providing a device of the above-mentioned character which is simple and durable in construction, reliable and efficient in operation and inexpensive to manufacture.

Other objects and advantages of the invention will be apparent during the course of the following specification.

Figure 1:
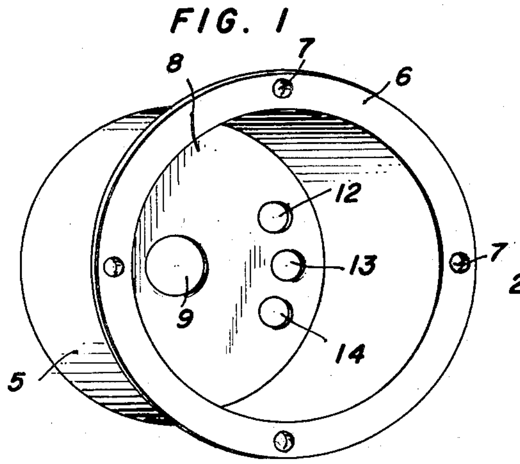
Figure 2:
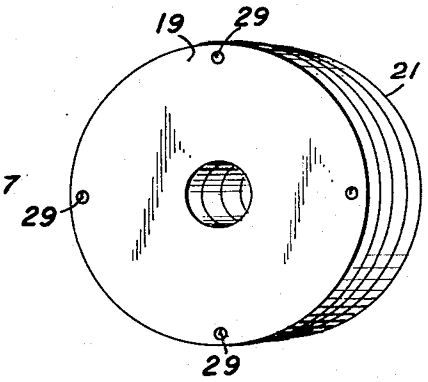
Figure 3:
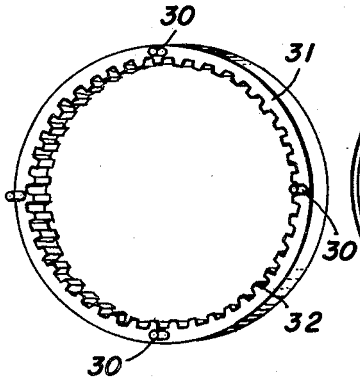
Figure 4:
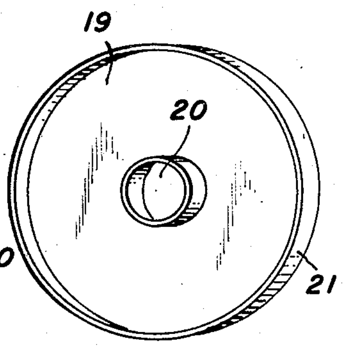
Figure 5:
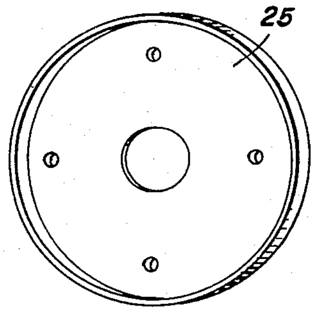
Figure 6:
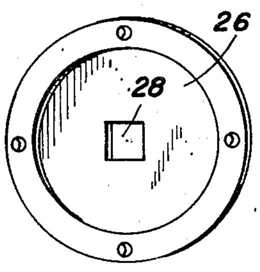
Figures 7, 9:
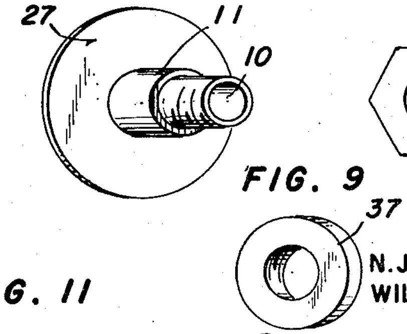
Figure 8:
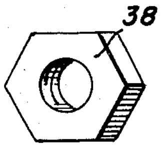
Figure 10:
Figure 11:
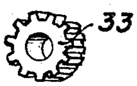
Figure 12:
Figure 13:
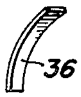
Figure 14:
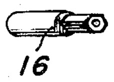
Figure 18:
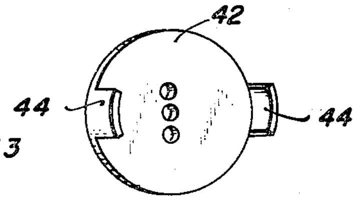
Figure 19:
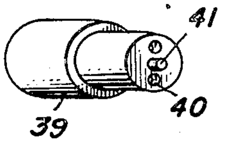
Figure 20:
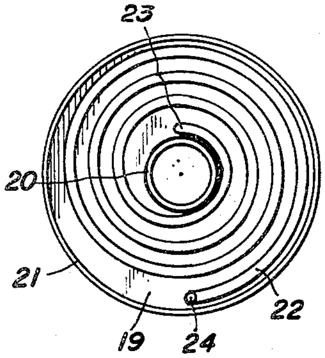
Figure 21:
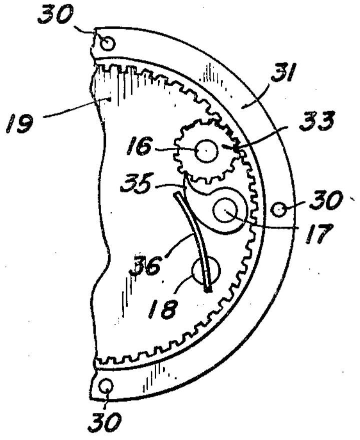
Figure 23:
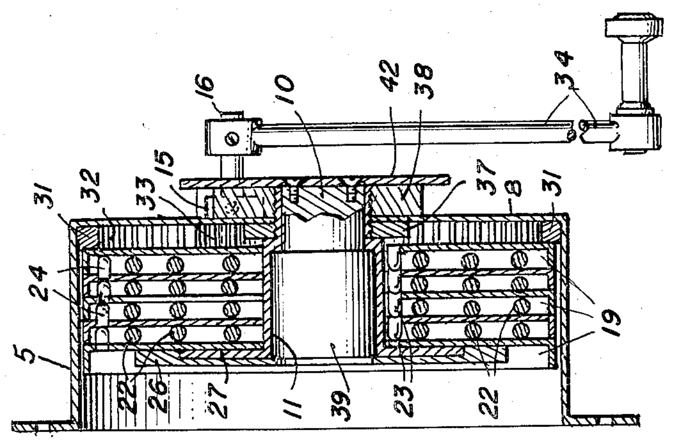
Figure 22:
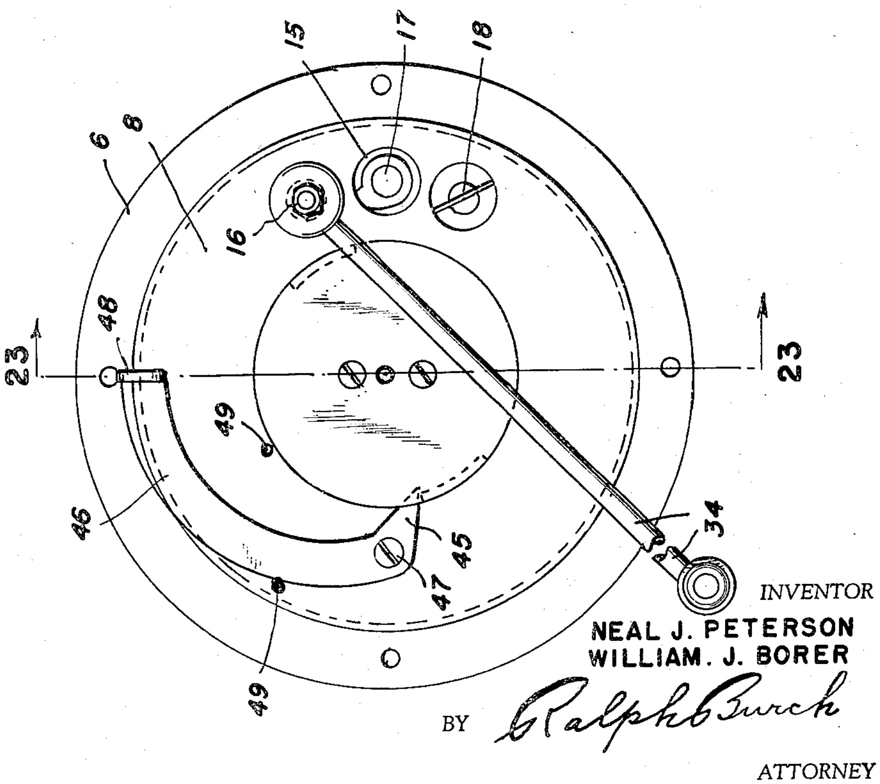

In the accompanying drawings forming a part of this specification and in which like numerals are employed to designate like parts throughout the same, Fig. 1 is a perspective view of the spring motor housing, Fig. 2 is a perspective view of the spring units in assembled relation, Fig. 3 is a perspective view of the ring gear attached to the spring assembly, Fig. 4 is a perspective view of one of the spring housing disks, Fig. 5 is a perspective view of the innermost spring housing disk, Fig. 6 is a perspective view of the plate attached to the disk shown in Fig. 5, Fig. 7 is a perspective view of the main bearing, Figs. 8 and 9 are perspective views of nuts for attaching the main bearing to the end wall of the motor housing, Figs. 10, 11, 12, 13, 14, 15 and 16 are perspective views of the pinion gear, pawl and associated parts shown in Fig. 21, Figs. 17, 18 and 19 are perspective views of the shaft section and ratchet plate, Fig. 20 is a view in elevation of one of the springs mounted in its disk, Fig. 21 is a fragmentary view of the ring gear showing the pinion gear and associated pawl for rotating the ring gear, Fig. 22 is an end elevational view of the spring motor, and, Fig. 23 is a section taken on line 23—23 of Fig. 22.

Referring to the drawings, the numeral 5 denotes a casing or housing which is preferably circular in shape having a flange 6 at one end provided with apertures 7 for attaching the casing to the blower housing of the engine.

The end wall 8 of the casing has a central opening 9 to receive the screw threaded end 10 of the main bearing 11, Fig. 7, disposed axially of the casing. Concentrically arranged with respect to the opening 9 are a series of openings 12, 13 and 14 in the end wall 8 adapted to receive bearing grommets 15, Fig. 10, that support shafts 16, 17, and 18, Figs. 14, 15 and 16.

Figure 15:
Figure 16:

A series of disks 19 are disposed within the casing 5 having central openings to receive the main bearing 11, each disk being provided with a flange 21 around its outer periphery to space the disk from the next adjacent disk. The central opening of each disk may be provided with a flange 20, as shown in Fig. 4, but this flange may be omitted. Disposed between each pair of disks is a coil spring 22, formed of round spring steel wire, the ends of the spring being bent at right angles with the inner end 23 engaged in an aperture in one disk and the outer end 24 engaged in an aperture in the next adjacent disk. The disk 25, Fig. 5, which is nearest the open end of the casing supports a drive plate 26, Fig. 6, which encloses the flange 27 of the main bearing 11. A square opening 28 in the center of drive plate 26 receives the squared end of the engine crank shaft. The disk 19 nearest the closed end of the casing has a series of openings 29 adjacent its periphery adapted to receive the pins 30 of internal ring gear 31, Fig. 3. The teeth 32 of the internal gear mesh with the teeth of pinion gear 33, Fig. 11, mounted on shaft 16, Fig. 14, and attached to the outer end of shaft 16 is a hand lever 34 for turning the pinion gear and thereby rotate the internal ring gear. A pawl 35, Fig. 12, mounted on shaft 17, Fig. 15, is held in engagement with the pinion gear by a spring 36 supported by shaft 18 and holds the pinion gear against movement in one direction.

Figure 17:
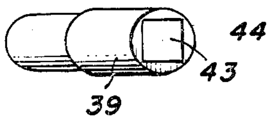

The disks 19 are held on the main bearing by a nut 37 threaded on the end 10 of bearing 11 inside the end wall of the casing, while a nut 38 threaded on the end 10 of the bearing outside the end wall firmly secures the bearing to the casing. A shaft section 39, Figs. 17–19, is journaled in the main bearing 11 and in one end is provided with screw threaded openings 40 and lug 41 for attaching the ratchet plate 42, Fig. 18, thereto. The opposite end of shaft section 39 is provided with a square socket 43 to receive the square end of the engine shaft. The ratchet plate 42 is provided with opposed lugs 44 extending from the peripheral edge towards the end wall of the casing. A pawl 45 on one end of lever 46 is adapted to move into and out of engagement with the lugs 44 upon pivotal movement of the lever on its pivot 47 mounted on the end wall of the casing. The lever 46 is substantially arcuate shape and has its free end bent outwardly to form a handle 48. Movement of the lever in both directions is limited by pins 49 mounted on the end wall of the casing.

In operation, rotation of the disks 19 upon turning of hand lever 34 winds the coil springs 22 which are held wound by engaging the pawl 45 of lever 46 with one of the lugs 44 of ratchet plate 42 and also by reason of the pawl 35 engaged with pinion gear 33. Upon moving lever 46 to release the ratchet plate 42, the shaft section 39 is free to rotate and the energy of the wound springs will rotate drive plate 26 to rotate the crank shaft to start the engine. By reason of the compound energy stored by the series of springs sufficient energy to rotate the engine shaft is provided at all times and insures positive starting of the engine.

It is to be understood the form of invention herein shown and described is a preferred example of the same and changes in the shape, size and arrangement of parts may be made without departing from the spirit of the invention.

Having thus described our invention, we claim:

1. In an engine starter, the combination of a shaft section for connection with the engine shaft, a bearing on said shaft section, a series of disks rotatably mounted on said bearings, a series of coil springs disposed intermediate said disks, each spring having one end connected to one disk and its other end to the next adjacent disk, a drive plate attached to the innermost disk having fixed connection with the engine shaft, a ring gear attached to the outermost disk, means for turning said ring gear to rotate said disks and wind said springs, a ratchet plate attached to the free end of said shaft section, and a releasable lever for engagement with said ratchet plate to hold said shaft section against rotation.

2. In an engine starter, the combination of a casing, a bearing disposed axially of said casing, a shaft section journaled in said bearing having connection with the engine shaft, a series of disks rotatably mounted on said bearing within said casing, the innermost disk having fixed connection with the engine shaft, a series of coil springs disposed intermediate said disks, each spring having one end connected to one disk and the other end to the next adjacent disk, means for rotating the free end disk to wind said springs, a ratchet plate attached to the free end of said shaft section, and a releasable lever mounted on said casing for engagement with said ratchet plate to hold said shaft section against rotation.

3. In an engine starter, the combination of a casing, a bearing disposed axially of said casing and fixedly connected thereto adapted to receive one end of the engine shaft, a series of disks rotatably mounted on said bearing, means fixedly connecting the innermost disk to the engine shaft, a series of coil springs disposed between said disks and surrounding said bearing one end of each spring being connected to one disk and the other end to the next adjacent disk, means for rotating the outermost disk to wind said coil springs, and releasable means for holding the engine shaft against rotation while the springs are wound.

4. In an engine starter, the combination of a casing having an end wall, a tubular bearing disposed axially of said casing and fixedly connected to the end wall adapted to receive one end of the engine shaft, a series of disks rotatably mounted on said bearing within said casing, a drive plate attached to the innermost disk fixedly mounted on the engine shaft, a series of spiral springs wound around said bearing and disposed between said disks, one end of each spring being connected to one disk and the other end to the next adjacent disk, a ring gear having internal teeth attached to the outermost disk, a pinion gear in mesh with said ring gear rotatably mounted on the end wall of said casing, means for rotating said pinion gear, a ratchet plate connected to the end of the engine shaft beyond the end wall of the casing having lugs thereon, and a pivoted lever mounted on the end wall of said casing for releasable engagement with the lugs of said ratchet plate.

5. In an engine starter, the combination of a casing having an outer end wall, a tubular bearing disposed axially of said casing and fixedly mounted in the end wall adapted to receive one end of the engine shaft, said bearing having an annular flange at its inner end, a series of disks rotatably mounted on said bearing between the flange of said bearing and end wall of said casing, a drive plate covering the flange of said bearing fixedly mounted on the engine shaft and attached to the innermost disk, a series of spiral springs wound around said bearing and disposed between said disks, one end of each spring being connected to one disk and the other end connected to the next adjacent disk, a ring gear having internal teeth attached to the outermost disk between the disk and end wall of the casing, a pinion gear in mesh with said ring gear rotatably mounted on the end wall of said casing, means for rotating said pinion gear on the outside of said end wall, a ratchet plate connected to the end of the engine shaft beyond the end wall of said casing having lugs around its marginal edge, and a lever pivotally mounted on the outerside of the end wall of said casing movable into releasable engagement with the lugs of said ratchet plate.

References Cited in the file of this patent

UNITED STATES PATENTS 651,125 Stiles ---------------- June 5, 1900
1,274,243 Chamberlain ---------- July 30, 1918
1,673,197 Kollmann ------------ June 12, 1928